United States Patent
Fujikake et al.

(10) Patent No.: US 9,206,848 B2
(45) Date of Patent: Dec. 8, 2015

(54) ROLLING BEARING UNIT (75) Inventors: Yasuhito Fujikake, Kuwana (JP);
Tomoya Nakamura, Kuwana (JP);
Hiroaki Suzuki, Kuwana (JP)

(73) Assignee: NTN CORPORATION, Osaka (JP)

( * ) Notice: Subject to any disclaimer, the term of this patent is extended or adjusted under 35 U.S.C. 154(b) by 61 days.

(21) Appl. No.: 14/129,626

(22) PCT Filed: Jun. 18, 2012

(86) PCT No.: PCT/JP2012/065512
§ 371 (c)(1),
(2), (4) Date: Mar. 31, 2014

(87) PCT Pub. No.: WO2013/008586
PCT Pub. Date: Jan. 17, 2013

(65) Prior Publication Data
US 2014/0219596 A1 Aug. 7, 2014

(30) Foreign Application Priority Data
Jul. 13, 2011 (JP) .................. 2011-154901

(51) Int. Cl.
*F16C 33/66* (2006.01)
*F16C 19/54* (2006.01)
(Continued)

(52) U.S. Cl.
CPC ........... *F16C 33/6614* (2013.01); *F16C 19/543* (2013.01); *F16C 19/548* (2013.01);
(Continued)

(58) Field of Classification Search
CPC ............. F16C 33/6614; F16C 33/6651; F16C 33/6677; F16C 33/6681

USPC .......... 384/470, 492, 504, 528, 534, 625, 907
See application file for complete search history.

(56) References Cited

U.S. PATENT DOCUMENTS

| | | | | |
|---|---|---|---|---|
| 5,320,433 A | * | 6/1994 | Kimata et al. ................. | 384/473 |
| 2004/0234181 A1 | | 11/2004 | Kobayashi et al. | |
| 2007/0003178 A1 | | 1/2007 | Koyama | |
| 2011/0150379 A1 | * | 6/2011 | Hayashi ........................ | 384/470 |
| 2012/0328225 A1 | | 12/2012 | Ito et al. | |

FOREIGN PATENT DOCUMENTS

| | | |
|---|---|---|
| JP | 4-132220 | 12/1992 |
| JP | 6-35659 | 5/1994 |

(Continued)

OTHER PUBLICATIONS

International Search Report issued Jul. 24, 2012 in International (PCT) Application No. PCT/JP2012/065512.

(Continued)

*Primary Examiner* — Phillip A Johnson
(74) *Attorney, Agent, or Firm* — Wenderoth, Lind & Ponack, L.L.P.

(57) ABSTRACT

Radial passages (22) that penetrate from the inner diameter side to the outer diameter side of a retainer (8) are provided between inner wall surface portions (14) of a pocket (10) facing each other in an axial direction of the retainer and a rolling element (6) so that the radial passages (22) serve as a grease reservoir as well as a grease passage for allowing the grease adhering to the rolling element (6) to move onto an outer ring raceway surface (4a). The radial passages (22) are made up of arc-shaped spaces (18) between the rolling element (6) and the inner wall surface portions (14) of the inner wall surface of a pocket (10) and segment shaped spaces (20) between the rolling element (6) and arcuate recesses (16) at the four corners of the pocket (10).

20 Claims, 9 Drawing Sheets (51) Int. Cl.
    *F16C 33/38*     (2006.01)
    *F16C 33/46*     (2006.01)

(52) U.S. Cl.
    CPC ......... *F16C33/3837* (2013.01); *F16C 33/3843* (2013.01); *F16C 33/3887* (2013.01); *F16C 33/4623* (2013.01); *F16C 33/6607* (2013.01); *F16C 33/6622* (2013.01); *F16C 33/6629* (2013.01); *F16C 2204/66* (2013.01); *F16C 2208/32* (2013.01)

(56) References Cited

FOREIGN PATENT DOCUMENTS

| JP | 11-166540 | 6/1999 |
|---|---|---|
| JP | 2000-145787 | 5/2000 |
| JP | 2002-98150 | 4/2002 |
| JP | 2002147464 A * | 5/2002 |
| JP | 2004-316852 | 11/2004 |
| JP | 2006-9816 | 1/2006 |
| JP | 2007-232177 | 9/2007 |
| JP | 2008-133894 | 6/2008 |
| JP | 2008-286296 | 11/2008 |
| JP | 2009-14205 | 1/2009 |
| JP | 2009-168110 | 7/2009 |
| JP | 2011-133060 | 7/2011 |
| JP | 2011-226632 | 11/2011 |

OTHER PUBLICATIONS

International Preliminary Report on Patentability and Written Opinion of the International Searching Authority issued Jan. 23, 2014 in International (PCT) Application No. PCT/JP2012/065512.

Extended European Search Report issued Jul. 2, 2015 in corresponding European Patent Application No. 12810623.4.

* cited by examiner

ROLLING BEARING UNIT

TECHNICAL FIELD

The present invention relates to rolling bearing units, and more particularly to the structure of a rolling-element guided retainer of a rolling bearing unit which is adapted to supply grease from an inner ring spacer to the retainer.

BACKGROUND ART

Some bearings are used in low-temperature and high-speed rotational environments such as in a liquid fuel turbo pump for a rocket engine or in a vacuum environment such as in space apparatus. Since these bearings cannot encapsulate a large amount of a fluid lubricant (grease), it is conceivable that a spacer having an oil reservoir for storing the lubricating oil is provided on the inner ring side of the bearing and the oil is then supplied with the help of the centrifugal force developed by the bearing being rotated. The applicant has suggested such a structure in a previous application (Japanese Patent Application No. 2010-227652).

On the other hand, disclosed in Patent Literature 1 is an angular ball bearing with a retainer riding on the inner circumferential surface of the outer ring, in which a lubricant supply mechanism is provided for supplying grease or the base oil of the grease to the guide surface of the inner circumferential surface of the outer ring in order to suppress grating noise, that is, the noise of the retainer in a low-speed operation region. Then, a grease reservoir in the shape of a circumferential groove is provided in the inner circumferential surface of the retainer so as to supply the base oil of the grease into between the retainer and the inner circumferential surface of the outer ring via through holes in the retainer (see FIGS. 9 to 13 in Patent Literature 1).

In Patent Literature 2, disclosed is a ball bearing which employs, as a grease reservoir, a space between the neighboring pockets of a retainer. The inner and outer circumferential surfaces of the retainer are provided with the surface lay in the circumferential direction, so that the base oil separated from the grease retained in the grease reservoir is allowed to flow and to be supplied along the surface lay onto the surface of each of the rolling elements.

CITATION LIST

Patent Literature

Patent Literature 1: Japanese Patent Application Laid-Open under No. 2008-286296
Patent Literature 2: Japanese Patent Application Laid-Open under No. 2000-145787

SUMMARY OF INVENTION

Technical Problem

Figure 14:
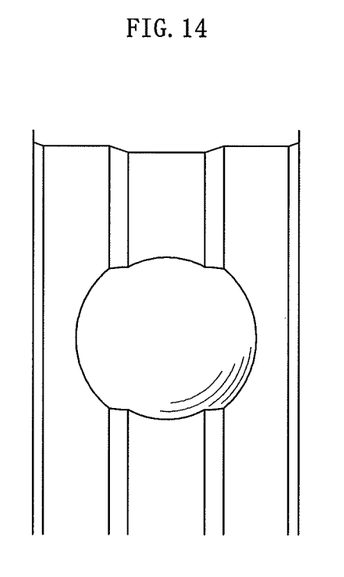
FIG. 14 is a partial view illustrating a rolling element accommodated in a retainer of a conventional example when viewed from the inner diameter side.

In general, the retainer to be used for the grease lubricated bearing is of a rolling-element guided type and provided, along the entire circumference of a pocket for accommodating each of the rolling elements, with a projection or a rolling element retention for preventing the rolling element from falling out of the bearing (see FIG. 14). Thus, even though the grease or the base oil of the grease supplied toward the retainer from the inner ring spacer may adhere to the rolling element, it is scraped off by the rolling element retention and hindered from being supplied to the raceway surface, in particular, to the raceway surface of the outer ring.

The rolling bearing disclosed in Patent Literature 1 has an outer ring guided retainer and has a unique problem of retainer noise. To address the problem of retainer noise, the rolling bearing is configured to supply grease onto the retainer guiding surface of the outer ring. The arrangement, however, is not designed to supply the grease to the raceway surface. Furthermore, the size and the number of the through holes provided in the retainer need to be increased in order to accelerate the supply of the grease or the base oil, leading to a manufacturing problem.

The rolling bearing disclosed in Patent Literature 2 also employs a crown-shaped retainer for retaining each of the rolling elements in a pocket having a part-spherical inner circumferential surface. This does not solve the aforementioned problem peculiar to the rolling element guided retainer; that is, the grease adhering to the rolling element is scraped off by the rolling element retention and thus hindered from being supplied to the raceway surface. Furthermore, the technical means of supplying, with the help of the capillary action, the base oil separated from the grease to the rolling element along the circumferential surface lay is not sufficient to maintain favorable lubrication because only a limited amount of the base oil is supplied onto the raceway surface.

It is therefore a major object of the present invention to provide a rolling bearing unit having a rolling-element guided retainer with a structure which facilitates supplying grease fed from the inner ring spacer to the outer ring raceway surface.

Solution to Problem

The object of the invention is achieved by providing a rolling element retention of a rolling-element guided retainer only on each of a pair of pocket inner wall surface portions facing each other in the circumferential direction of the retainer while doing away with the rolling element retention on a pair of pocket inner wall surface portions facing each other in the axial direction of the retainer, thereby forming a relatively large radial passage, increased in size accordingly, which penetrates from the inner diameter side to the outer diameter side of the retainer.

That is, a rolling bearing unit of this invention includes: an inner ring 2 having a raceway surface 2a on an outer circumference thereof; an inner ring spacer 3 being in contact with an end face of the inner ring 2 and rotated in conjunction with the inner ring 2; an outer ring 4 having a raceway surface 4a on an inner circumference thereof; a plurality of rolling elements 6 interposed between the raceway surface 2a of the inner ring 2 and the raceway surface 4a of the outer ring 4; and a retainer 8 disposed between the inner ring 2 and the outer ring 4 and having a plurality of pockets 10 for accommodating the rolling elements 6. In the rolling bearing unit, a centrifugal force is used to supply grease from the inner ring spacer 3 toward the retainer 8, and a radial passage 22 penetrating from the inner diameter side to the outer diameter side of the retainer 8 is provided between the inner wall surface of the pocket 10 and the rolling element 6 so as to use the radial passages 22 as a grease reservoir as well as a grease passage for allowing the grease adhering to the rolling element 6 to move onto the raceway surface 4a of the outer ring. More specifically, each of the radial passages 22 is made up of segment shaped spaces 20 each formed between an arcuate recess 16 formed at four corners of the pocket 10 and the rolling element 6 and an arc-shaped space 18 formed between one of first inner wall surface portions 14 of the pocket 10 facing each other in the axial direction of the retainer and the rolling element 6.

Advantageous Effects of Invention

The rolling bearing unit including the rolling-element guided retainer according to the invention ensures that grease fed from the inner ring spacer is supplied onto the outer ring raceway surface. That is, the grease fed by the action of centrifugal force from the inner ring spacer 3 toward the outer diameter side is allowed to move onto the inner circumferential surface of the retainer 8 and then flow into the radial passage 22 (the arc-shaped space 18 and the segment shaped spaces 20) between the pocket 10 of the retainer 8 and the rolling element 6 so as to be stored therein. The grease is further supplied therefrom onto the raceway surface 4a of the outer ring 4. Consequently, unlike before, the rolling element retentions will never cause the grease fed from the inner ring spacer toward the retainer to be inhibited from moving from the inner diameter side toward the outer diameter side of the retainer and hence to the outer ring raceway surface.

Figure 1A:
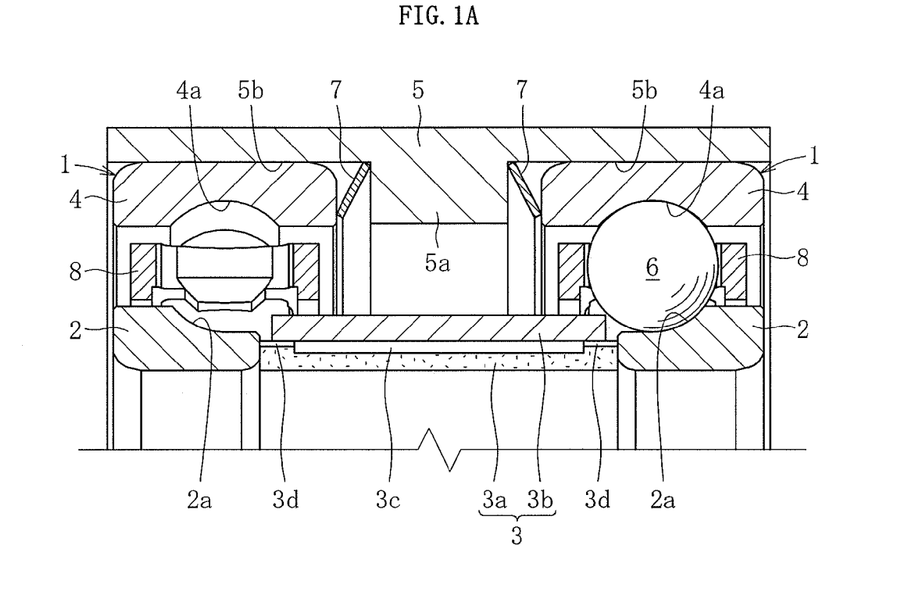
FIG. 1A is a cross-sectional view illustrating an embodiment of this invention.
Figure 1B:
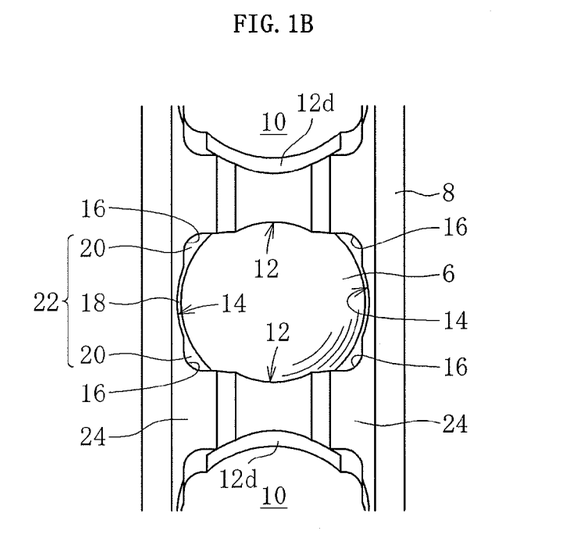
FIG. 1B is a view illustrating a retainer of FIG. 1A when viewed from the inner diameter side thereof.

FIG. 1B and FIG. 14 illustrate the rolling bearing according to the present invention and a conventional rolling bearing in contrast. Each figure shows the retainer accommodating the rolling element when viewed from the inner diameter side. In FIG. 14 illustrating the conventional technique, there is only a slight clearance between the rolling element retention of the retainer and the rolling element, with no space penetrating the retainer in the radial direction. Although the clearance is present between the rolling element retention and the rolling element, it is only a minute gap and curved along the surface of the rolling element so as not to linearly penetrate in the radial direction.

In contrast to this, in FIG. 1B illustrating an embodiment of this invention, there is provided a relatively large room between a pair of pocket inner wall surface portions 14 facing each other in the axial direction of the retainer and the rolling element 6 (the radial passage 22=the arc-shaped space 18+the segment shaped spaces 20). Furthermore, the room penetrates in the radial direction of the retainer, in other words, linearly extends with no obstacles present. The room is significantly increased in cross-sectional area when compared with the clearance as in the conventional technique, and thus serves to facilitate and accelerate the movement of the grease from the inner diameter side toward the outer diameter side of the retainer 8.

Taking the angular ball bearing of nominal number 7009 (45 mm inner diameter, 75 mm outer diameter, 16 mm width, 30° contact angle) as an example, the cross-sectional area of an opening through the retainer as viewed from the inner diameter side toward the outer diameter side is 0 mm$^2$ for the conventional example shown in FIG. 14 and 5.4 mm$^2$ for the embodiment shown in FIG. 1B.

DESCRIPTION OF EMBODIMENTS

First, a description will be made of the basic configuration of a rolling bearing unit that is provided with a grease reservoir in an inner ring spacer so as to supply the grease onto the raceway surface of an outer ring with the help of centrifugal force.

Figure 2A:
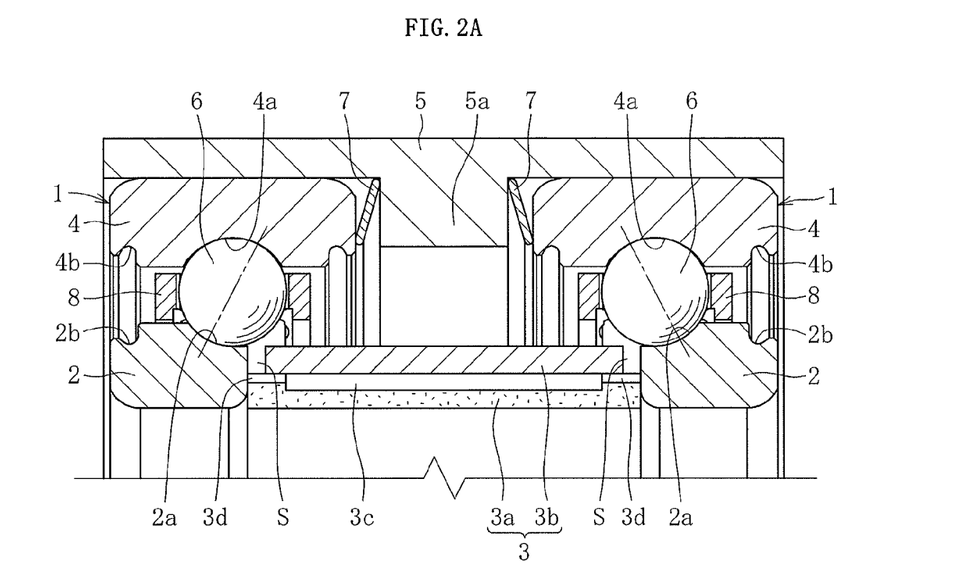
FIG. 2A is a cross-sectional view similar to FIG. 1A.
Figure 2B:
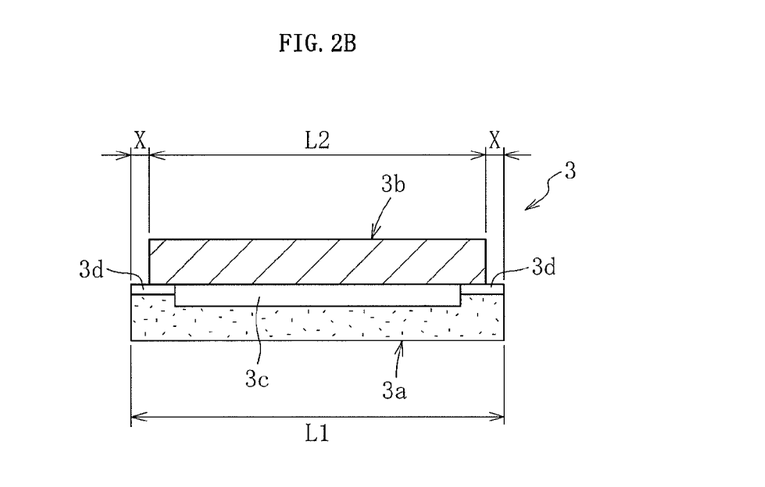
FIG. 2B is a cross-sectional view illustrating an inner ring spacer of FIG. 2A.

A rolling bearing unit illustrated in FIGS. 2A and 2B includes double rows of angular ball bearings 1 and is applied to a liquid fuel turbo pump bearing of a rocket engine which is used in a low-temperature and high-speed rotational environment. As illustrated, the angular ball bearing has a contact angle, i.e., the angle formed by a plane (radial plane) perpendicular to the bearing center axis and the line of action (denoted by the alternate long and short dashed lines in FIG. 2A) of the resultant of forces transmitted to the rolling element by the race rings (the inner ring and the outer ring).

Figure 3:
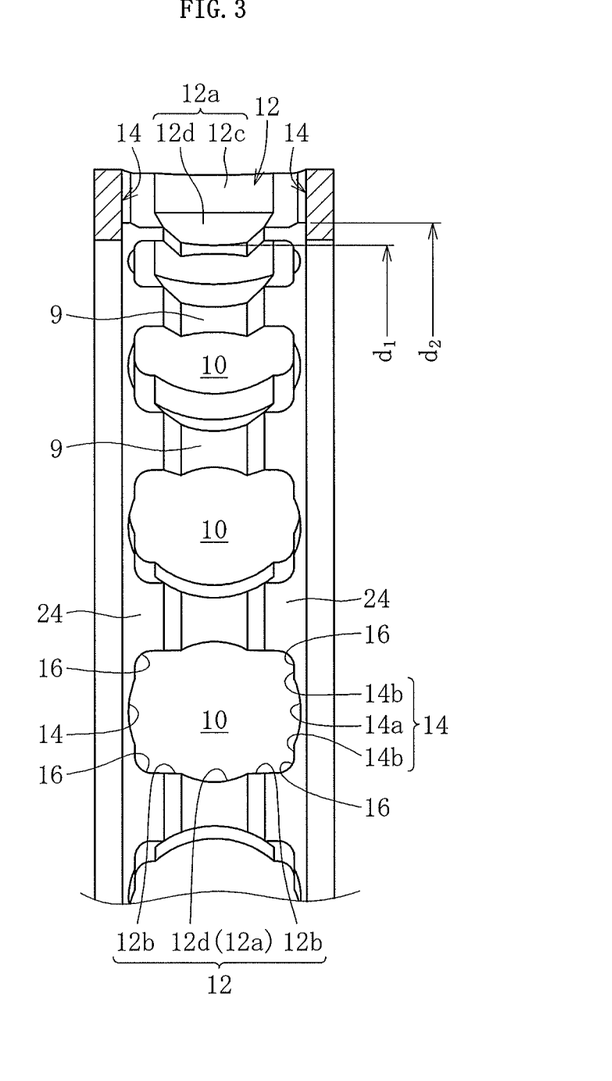
FIG. 3 is a cross-sectional view illustrating the retainer of FIG. 1A.

Each angular ball bearing 1 is composed of an inner ring 2, an outer ring 4, a plurality of rolling elements 6, and a retainer 8 as main components. The inner ring 2 has a raceway surface 2a on the outer circumference thereof and is secured to a rotating shaft (not shown) with an inner ring spacer 3 interposed between a pair of inner rings 2. The outer ring 4 has a raceway surface 4a on the inner circumference thereof and is secured to a housing (not shown) with an outer ring spacer 5 interposed between a pair of outer rings 4. A plurality of rolling elements 6 (balls in this example) are interposed between the raceway surface 2a of the inner ring 2 and the raceway surface 4a of the outer ring 4 and in contact with each of the raceway surfaces 2a and 4a at a contact angle (That is why it is called angular contact). The retainer 8, which is located between the inner ring 2 and the outer ring 4, has pockets 10 for accommodating the rolling elements 6 as shown in FIG. 3 and serves to retain the plurality of rolling elements 6 at predetermined intervals in the circumferential direction. Reference numeral 9 indicates a pillar provided between a pair of adjoining pockets 10 of the retainer 8.

The inner ring spacer 3 has a cylindrical shape and the end faces thereof are in contact with the end faces of the double rows of inner rings 2 so as to define the axial position of the inner rings 2. When the bearings are rotated, the inner rings 2 and the inner ring spacer 3 are integrally rotated. The inner ring 2 takes the form of a so-called stepped inner ring in which one of the inner bearing shoulders that is not in angular contact with the rolling element 6 is cut off. Thus, the rolling element 6 is positioned outwardly in the radial direction of the inner ring spacer 3 with the surface of the rolling element 6 closely facing the outer end circumference of the inner ring spacer 3.

The outer ring spacer 5 has a cylindrical outer circumferential surface and a similarly cylindrical inner circumferential surface, at the center of which is provided a projection 5a protruding radially inwardly. The outer ring 4 is inserted into the cylindrical inner circumferential surface of the outer ring spacer 5, and between the outer ring 4 and the projection 5a is disposed a resilient member, for example, a disc spring 7 for preloading the bearing.

Although not illustrated, both the axial ends of the bearing unit are typically sealed by a sealing device. This is done to prevent scattering of the lubricant out of the bearing and entry of foreign matters from outside. It is possible to select and employ a known sealing device. For example, a contact or non-contact sealing device is configured to include a seal or shield with the outer diameter end fitted into a groove 4b formed in the inner circumferential surface of the shoulder of the outer ring 4 and with the inner diameter end being faced to a groove 2b formed in the outer circumferential surface of the shoulder of the inner ring 2. Note that the sealing device can also be omitted.

For example, the inner ring 2, the outer ring 4, and the rolling elements 6 can be made of martensitic stainless steel. The retainer 8 can be made of a plastic such as a composite material with glass fiber or carbon fiber added to PEEK or the like. Alternatively, the retainer 8 may also be made of a metal material such as carburized steel, aluminum alloy, stainless steel, and copper alloy. To reduce friction at the initial stage of rotation, at least one of the surfaces of the inner ring raceway surface 2a, the outer ring raceway surface 4a, and the rolling elements 6 is preferably provided with a solid-lubrication film of PTFE or the like. For similar purposes, the entire surface including the inner surface of each pocket of the retainer 8 may be provided with a solid lubrication film made of PTFE or the like. It is also effective to apply grease in advance to the inner ring raceway surface 2a and the outer ring raceway surface 4a.

The inner ring spacer 3 has the shape of a double cylinder that is made up of an inner cylinder 3a and an outer cylinder 3b. A grease reservoir 3c is formed between the inner cylinder 3a and the outer cylinder 3b by forming an annular groove on the outer circumference of the inner cylinder 3a and then being covered with the outer cylinder 3b so as to serve as a space for encapsulating grease. Furthermore, a plurality of grooves 3d extending from the grease reservoir 3c to the end faces of the inner cylinder 3a are provided on the outer circumferential surface of the inner cylinder 3a in the circumferential direction. The grooves 3d communicate with the grease reservoir 3c and open at the setback X of the outer cylinder 3b from the inner cylinder 3a, the opening serving as a grease discharge groove (hereafter, symbol 3d will also be used to denote the grease discharge grooves). The amount of grease discharged during rotation can be adjusted according to the total amount of opening of the grease discharge grooves 3d.

The outer cylinder 3b is formed in a cylindrical shape and made of a plastic or metal material. The end faces of the outer cylinder 3b are brought closely to the end face of the inner ring 2 while the ends of the outer cylinder 3b are relatively widely chamfered so as to prevent interference with the rolling element 6. As shown in FIG. 2B, the length $L_2$ of the outer cylinder 3b is shorter than the length $L_1$ of the inner cylinder 3a ($L_1 > L_2$), and the set back of the end face of the outer cylinder 3b from the end face of the inner cylinder 3a is denoted in FIG. 2B by symbol X. Thus, when the inner ring spacer 3 made up of the inner cylinder 3a and the outer cylinder 3b is interposed between a pair of inner rings 2, the end faces of the inner cylinder 3a are brought into contact with the end faces of the inner rings 2 to position the inner rings 2 in the axial direction. Furthermore, a space S is formed along the entire circumference between the end face of the inner ring 2 and the end face of the outer cylinder 3b. Symbol X also means the width size of the space S.

When the inner ring spacer 3 is rotated in conjunction with the inner rings 2, a centrifugal force causes the grease encapsulated in the grease reservoir 3c to flow out through the aforementioned spaces S toward the outer diameter side. The space S will be hereafter referred to as the grease supply path. As mentioned earlier, the so-called stepped inner ring is employed as the inner ring 2, thereby allowing the surface of the rolling element 6 to closely face the end outer circumference of the inner ring spacer 3. Thus, the grease having flown from the grease discharge grooves 3d toward the outer diameter side through the grease supply path S readily adheres to the surface of the rolling element 6. The grease further flows to reach the inner ring raceway surface 2a and the outer ring raceway surface 4a so as to lubricate the same.

Now, a description will be made of a structure for facilitating and accelerating the flow of the grease to the outer ring raceway surface 4a in the rolling bearing which is configured to supply the grease from the inner ring spacer 3 toward the retainer 8 with the help of centrifugal force as described above.

Referring to FIG. 1A, the angular ball bearing 1 on the left in the figure is illustrated with the rolling element 6 removed. FIGS. 1B and 3 are views of the retainer 8 of FIG. 1A when viewed from the inner diameter side. As shown in FIG. 1B, the pocket 10 of the retainer 8, which has a generally rectangular outline, is made up of a pair of inner wall surfaces 12 facing each other in the circumferential direction of the retainer 8, a pair of inner wall surfaces 14 facing each other in the axial direction of the retainer 8, and arcuate recesses 16 located at the four corners of the rectangle. The inner wall surfaces 12 facing each other in the circumferential direction of the retainer also serve as the side faces of the pillars 9 between the adjacent pockets 10.

As shown in FIG. 3, the pair of inner wall surfaces 12 facing each other in the circumferential direction of the retainer each have a center arc section 12a and straight sections 12b on both sides thereof. The radius of curvature of the arc section 12a is greater than that of the rolling element 6 and a predetermined clearance is formed between the arc section 12a and the rolling element (ball) 6 in a neutral state. Taking an angular ball bearing of nominal number 7009 as a specific example, the rolling element 6 has a diameter of 9.525 mm and the distance between the opposed surfaces of the straight sections 12b is 7.09 mm.

The pair of inner wall surfaces 14 facing each other in the axial direction of the retainer each have a center arc section 14a and straight sections 14b on both sides thereof. The radius of curvature of the arc section 14a is equal to that of the arc section 12a mentioned above and greater than the radius of curvature of the rolling element 6. Thus, as can be seen clearly in FIG. 1B, there is formed an arc-shaped space 18 between the arc section 14a and the rolling element 6. Taking the angular ball bearing of nominal number 7009 as a specific example, the distance between the opposed surfaces of the straight sections 14b is 9.20 mm.

The arcuate recesses 16 located at the four corners of the pocket 10 are formed in the shape of a so-called relief. Between each arcuate recess 16 and the rolling element 6 is formed a segment shaped space 20. The aforementioned arc-shaped space 18 and the segment shaped spaces 20 at both the ends thereof constitute one radial passage set 22. There are two radial passage sets 22 per one pocket 10. The rolling element retention which the rolling element guided retainer used to have is not provided on the entire circumference of each pocket of the rolling element guided retainer, but rather, no such rolling element retention is provided on a pair of pocket inner wall surfaces facing each other in the axial direction of the retainer. Accordingly, this can ensure the radial passage 22 which penetrates from the inner diameter side toward the outer diameter side of the retainer and has a relatively large cross-sectional area, and the radial passage 22 is used to facilitate and accelerate the movement of the grease in the radial direction of the retainer.

FIG. 1B and FIG. 14 both show in contrast an embodiment and a comparative example of a retainer with a rolling element accommodated in a pocket of the retainer when viewed from the inner diameter side of the retainer. It can be observed that in the comparative example of FIG. 14, there is no space between the pocket and the rolling element, whereas in the embodiment of FIG. 1B, there are relatively large spaces, i.e., the radial passages 22, on the right and left of the rolling element 6 in the figure. The radial passages 22 are also used as a grease reservoir as well as a grease passage for allowing the grease adhering to the rolling element 6 to move toward the outer ring raceway surface 4a. That is, the grease flowing out of the grease discharge grooves 3d of the inner ring spacer 3 by the action of centrifugal force so as to be supplied through the grease supply path S toward the outer diameter side moves to the inner circumferential surface of the retainer 8. Then, the grease flows into the radial passages 22 between the pocket 10 of the retainer 8 and the rolling element 6 (the arc-shaped space 18 and the segment shaped spaces 20) so as to be stored therein, and subsequently supplied to the raceway surface 4a of the outer ring 4. Thus, unlike in the conventional case, the rolling element retention does not inhibit the grease from moving from the inner diameter side toward the outer diameter side of the retainer.

As shown in FIGS. 1B and 3, two inner diameter side annular grooves 24 in two rows are formed in the inner circumference of the retainer 8. The inner diameter side annular grooves 24 are arranged in parallel to each other while avoiding the widthwise center of the retainer 8. The inner wall surface portions 14 of those of the pocket 10 of the retainer 8, the inner wall surface portions 14 facing each other in the axial direction of the retainer, are accommodated within the width of the inner diameter side annular grooves 24. In other words, the radial passages 22 open to the inner diameter side annular grooves 24. The center portion sandwiched between the two rows of inner diameter side annular grooves 24 is raised like a ridge with respect to the inner diameter side annular grooves 24 serving as a furrow, that is, smaller in diameter than the inner diameter side annular grooves 24. FIG. 3 shows the inner diameter of the center portion denoted by symbol $d_1$ and the inner diameter of the inner diameter side annular grooves 24 denoted by symbol $d_2$. The end face of the center portion that faces the pocket 10 serves as a rolling element retention 12d, to be described below. Thus, the dimension denoted by symbol $d_1$ is also the inner diameter of the rolling element retention 12d.

Figure 4A:
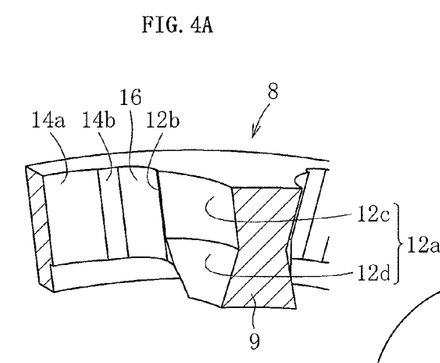
FIG. 4A is a partially cutaway perspective view illustrating the retainer.
Figure 4B:
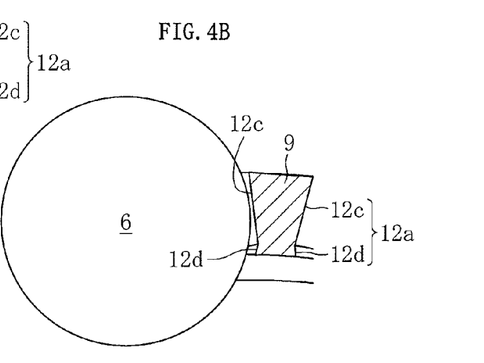
FIG. 4B is a partial cross-sectional view illustrating a rolling element accommodated in a pocket.
Figure 5A:
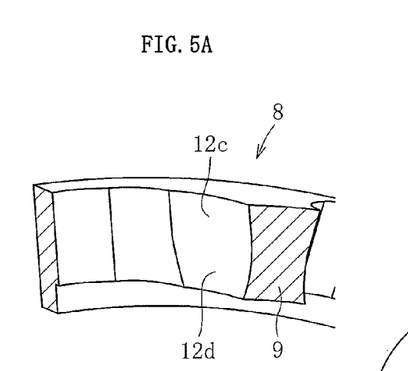
FIG. 5A is a partially cutaway perspective view illustrating a retainer.
Figure 5B:
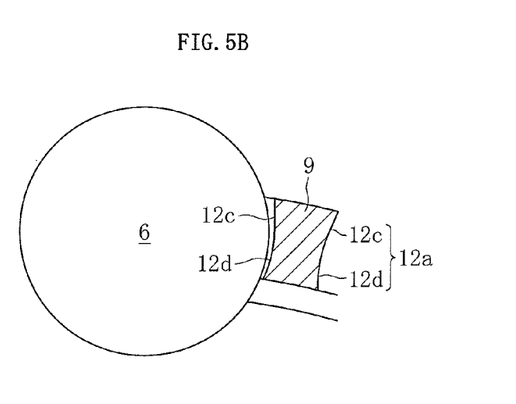
FIG. 5B is a partial cross-sectional view illustrating a rolling element accommodated in a pocket.

The arc section 12a of the inner wall surfaces 12 facing each other in the circumferential direction of the retainer is further divided into a guide section 12c located on the outer diameter side of the retainer and the rolling element retention 12d located on the inner diameter side of the retainer. The guide section 12c has a part-cylindrical shape greater in diameter than the rolling element 6 and comes in contact with the rolling element 6 to guide the same during the rotation of the bearing. The rolling element retention 12d is reduced in diameter down to a diameter smaller than that of the rolling element 6 as it proceeds toward the inner diameter side of the retainer. This arrangement ensures that the rolling element retention 12d prevents the rolling element 6 from falling toward the inner diameter side of the retainer. Specifically, the rolling element retention 12d has a conical surface shape as illustrated in FIGS. 4A and 4B, or a spherical surface shape as illustrated in FIGS. 5A and 5B.

As can be seen from FIG. 3, the rolling element retention 12d is located within the inner diameter side annular grooves 24 and projects toward the inner diameter side of the retainer, thus reducing the volume of the inner diameter side annular grooves 24. To increase the volume of the inner diameter side annular grooves 24, the inner diameter $d_1$ of the rolling element retention needs to be increased. Taking the manufacturing aspect into account, it is desirable to make the inner diameter of the rolling element retention equal to the inner diameter $d_2$ of the inner diameter side annular grooves 24. When the inner diameter $d_1$ of the rolling element retention 12 is increased, however, as shown by a comparison of FIG. 4B with FIG. 5B the conical inner circumferential surface of the rolling element retention 12d (FIG. 4A) is difficult to ensure a sufficient amount of interference with the rolling element 6 while the spherical inner circumferential surface (FIG. 5A) of the rolling element retention 12d is preferable so as to retain the rolling element 6 with reliability even when the inner diameter $d_1$ of the rolling element retention 12d is increased.

Figure 6A:
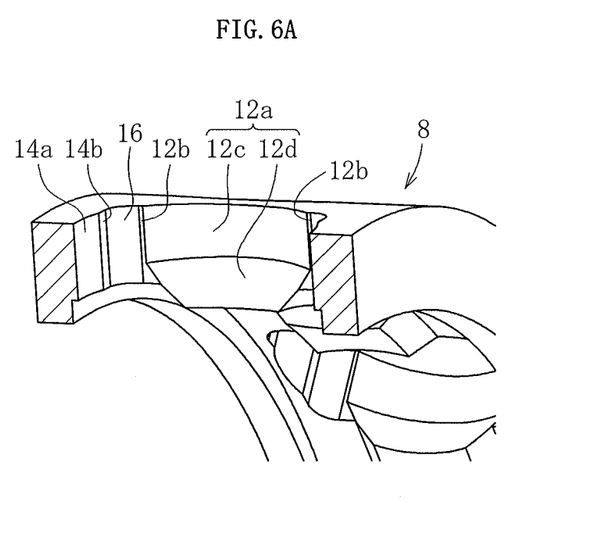
FIG. 6A is a partially cutaway perspective view illustrating a retainer.
Figure 6B:
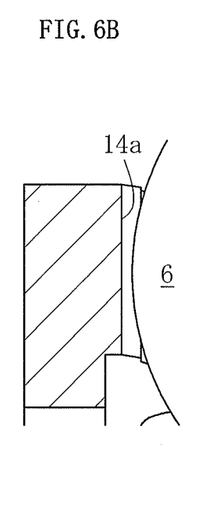
FIG. 6B is a partial cross-sectional view illustrating a rolling element accommodated in a pocket.
Figure 7A:
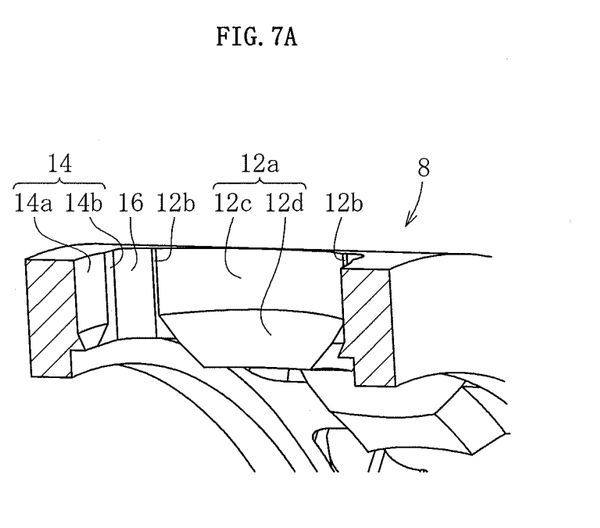
FIG. 7A is a partially cutaway perspective view similar to FIG. 6A.
Figure 7B:
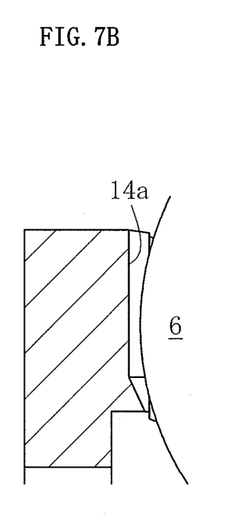
FIG. 7B is a partial cross-sectional view similar to FIG. 6B.

As shown in FIGS. 6A and 6B, the arc section 14a of the inner wall surface portion 14 has no rolling element retention. For comparison purposes, an example provided with such a rolling element retention is illustrated in FIGS. 7A and 7B. Since the inner wall surface portion 14 is not provided with a rolling element retention, whether conical or spherical, the volume of the radial passages 22 increases accordingly, which ensures an increase in the amount of grease to be held. This also allows, in particular, the inlet to the arc-shaped space 18 of the radial passage 22 to be widened, thus facilitating reception of the entry of the grease being supplied from the inner ring spacer 3.

Figure 8:
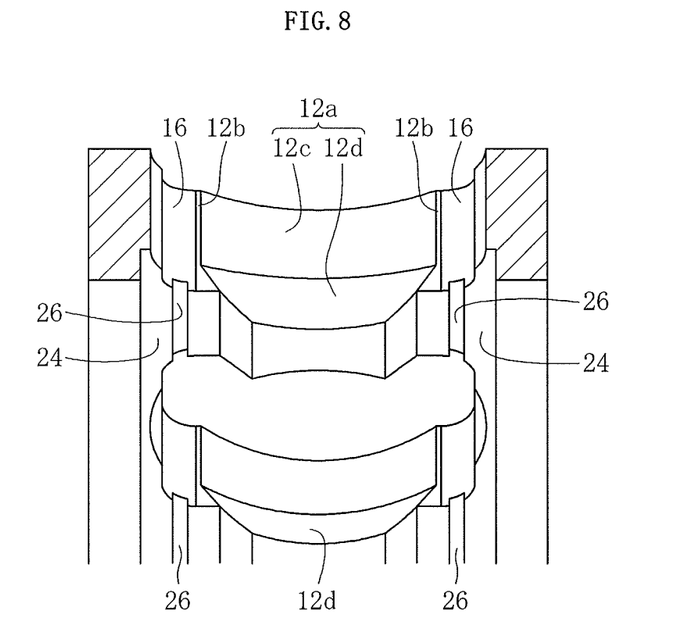
FIG. 8 is a partial cross-sectional view illustrating a retainer.
Figure 9:
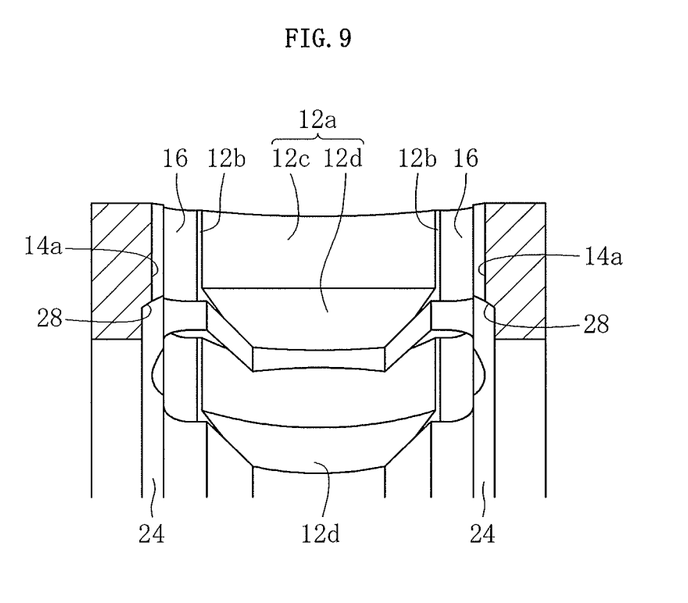
FIG. 9 is a partial cross-sectional view illustrating a retainer.

FIG. 8 illustrates an example in which the inner diameter side annular grooves 24 are provided with passageways 26 for allowing the arcuate recesses 16 adjacent in the circumferential direction to communicate with each other and thus the segment shaped spaces 20 to communicate with each other. The passageways 26 serve to direct the grease inside the inner diameter side annular groove 24 to the segment shaped spaces 20. Furthermore, FIG. 9 illustrates an example in which the arc section 14a of the inner wall surface portion 14 is connected to the inner diameter side annular groove 24 along an inclined surface 28. The inclined surface 28 serves to smoothly direct the grease inside the inner diameter side annular groove 24 to the arc-shaped space 18. While the passageways 26 and inclined surfaces 28 are effective on their own as described above, employing the same in combination more effective in directing the grease inside the inner diameter side annular groove 24 to the arc-shaped space 18 and the segment shaped space 20.

Figure 10A:
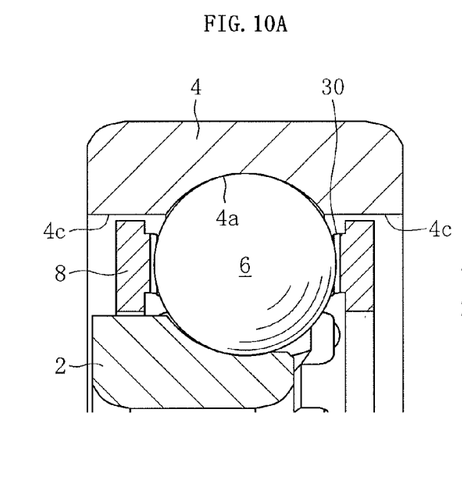
FIG. 10A is a cross-sectional view illustrating a rolling bearing.
Figure 10B:
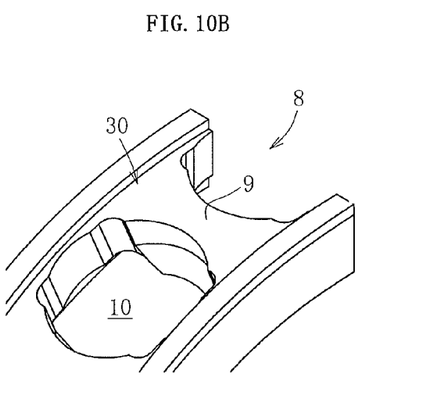
FIG. 10B is a partial perspective view illustrating a retainer.

FIGS. 10A and 10B illustrate an example in which an outer diameter side annular groove 30 is formed in the outer circumferential surface of the retainer 8. The outer diameter side annular groove 30 widthwise extends beyond the radial passage 22 (the arc-shaped space 18 and the segment shaped spaces 20) and terminates close by the ends of the retainer 8. The provision of the outer diameter side annular groove 30 prevents the grease to be supplied further toward the outer diameter raceway surface 4a through the radial passage 22 from being blocked by both sidewalls of the outer diameter side annular groove 30 and flowing out in the widthwise direction of the retainer 8. For similar purposes, the outer ring 4 preferably has shoulders, i.e., shoulder surfaces 4c on both sides of the raceway surface 4a. The outer ring 4 having the shoulders is accordingly configured to cover the outer diameter side annular groove 30 with the shoulder surfaces 4c facing the respective sidewalls of the outer diameter side annular groove 30. It is thus advantageous in preventing, with reliability, the grease supplied to the outer diameter side annular groove 30 from flowing out in the widthwise direction of the retainer.

Figure 11A:
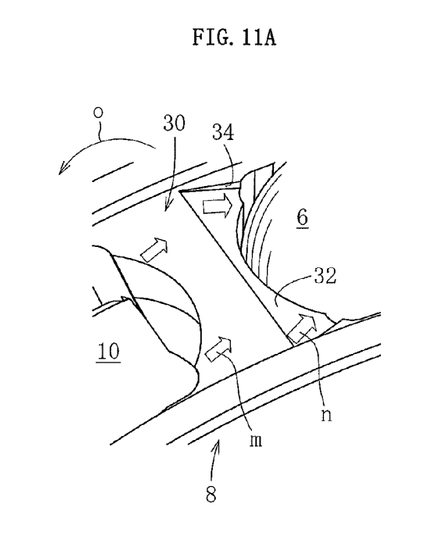
FIG. 11A is a partial perspective view illustrating a retainer.
Figure 11B:
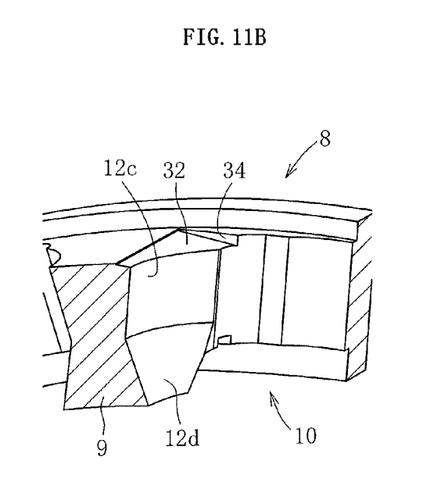
FIG. 11B is a partially cutaway perspective view illustrating the retainer.

FIGS. 11A and 11B illustrate an example in which an inclined surface 32 is provided in the outer diameter side annular groove 30. The inclined surface 32 is situated in front of each pocket 10 as viewed in the rotational direction of the retainer, is downwardly inclined toward the pocket 10 and gradually reduced in width toward the pocket 10. Reference numeral 34 indicates a step that is formed to reduce the width of the inclined surface 32. As denoted by symbol "o" in FIG. 11A, FIGS. 11A and 11B show an example of a bearing rotating in one direction. Thus, each pocket 10 is provided with only one inclined surface 32. In the case of a bidirectionally rotating bearing, the inclined surface 32 is provided on both sides of each pocket 10 in the circumferential direction. As the retainer 8 is rotated, the grease retained in the outer diameter side annular groove 30 moves along the outer diameter side annular groove 30 as denoted by arrow "m" in FIG. 11A. Provision of the inclined surface 32 and the step 34 in front of the pocket 10 as viewed in the rotational direction of the retainer allows the grease moving in the circumferential direction along the outer diameter side annular groove 30 to be directed toward the pocket 10 as denoted by symbol "n" in FIG. 11A and reduced in area to gain a greater travel speed, thereby enhancing the tendency of the grease to collect on the rolling element 6.

Figure 12A:
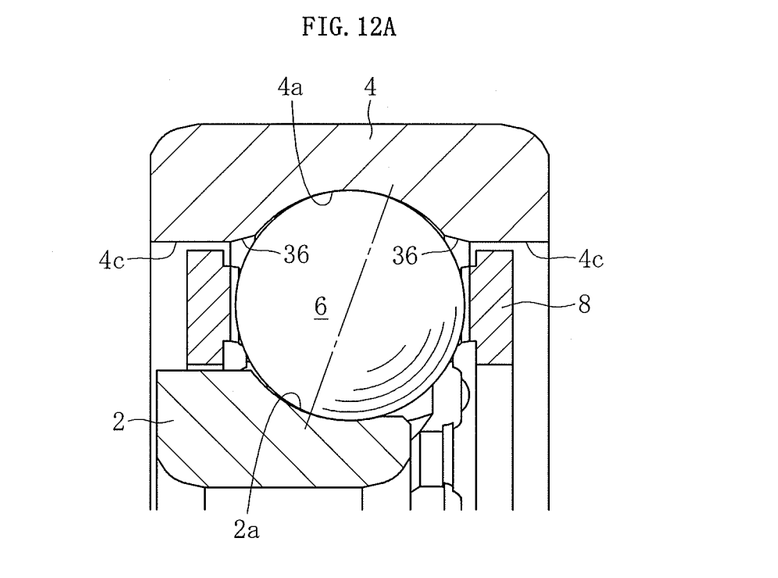
FIG. 12A is a cross-sectional view illustrating a rolling bearing.

FIG. 12A illustrates an example in which corner cut portions 36 are provided at the intersections of the raceway surface 4a and the shoulder surfaces 4c of the outer ring 4. The corner cut portion 36 is chamfered by an amount greater than typically done. Provision of the corner cut portions 36 chamfered by an amount greater than typically done at the of the raceway surface 4a and the shoulder surfaces 4c of the outer ring 4 in such a manner as to avoid the range in which the rolling element is in contact with the raceway surface allows the grease moved from the outer diameter side annular groove 30 toward the outer ring 4 to be readily drawn onto the raceway surface 4a. Furthermore, as illustrated, the axial outer end of each corner cut portion 36 may be located near the outer end of the outer diameter side annular groove 30 of the retainer 8, allowing the grease inside the outer diameter side annular groove 30 to be more effectively directed onto the raceway surface 4a.

Figure 12B:
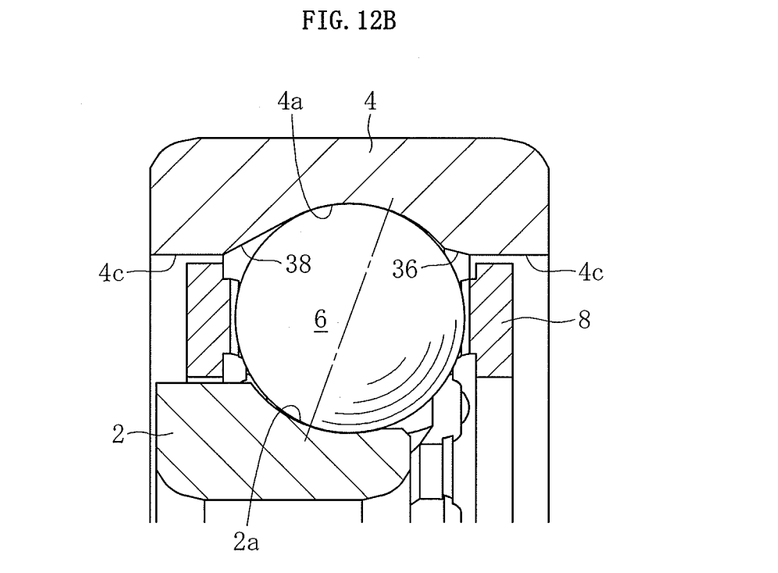
FIG. 12B is a cross-sectional view illustrating a rolling bearing.

The corner cut portions may be symmetric as shown in FIG. 12A, or alternatively, asymmetric as shown in FIG. 12B. In the case of the angular ball bearing, a corner cut portion 38 which is farther away from the intersection of the line of action of resultant of forces to be transmitted to the rolling element 6 (denoted by alternate long and short dashed lines) and the raceway surface 4a may be greater than that closer to the intersection. The increase in the corner cut portion 38 allows the grease moved from the outer diameter side annular groove 30 of the retainer 8 toward the outer ring 4 to be more readily drawn onto the raceway surface 4a and further deeply onto the raceway surface 4a. On the other hand, the raceway surface farther away from the intersection of the line of action of the resultant of forces to be transmitted to the rolling element 6 and the raceway surface 4a is not in substantial contact with the rolling element 6, resulting in that the increase in the corner cut portion 38 will not cause any functional trouble.

Figure 13:
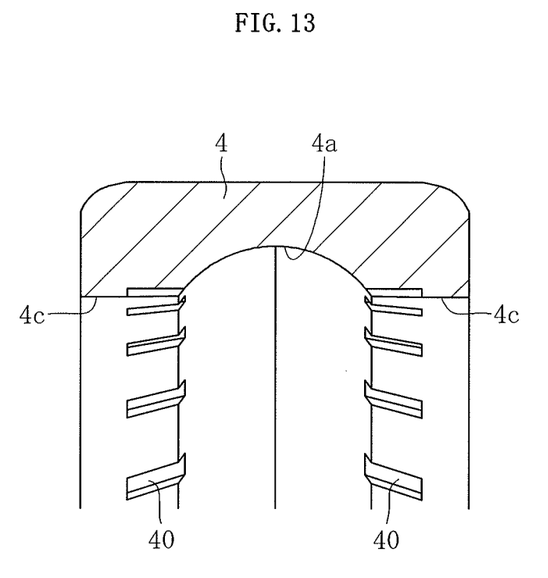
FIG. 13 is a partial cross-sectional view illustrating an outer ring.

FIG. 13 illustrates an example in which a plurality of inclined grooves 40 are provided in the shoulder surfaces 4c of the outer ring 4. Each of the inclined grooves 40 is not a clear-cut groove but opens at one end toward the raceway surface 4a and at the other terminating close by the end face of the outer ring 4. The inclined grooves 40 are tilted relative to the axis of the outer ring 4, with the outer ring end face side being situated behind, while the raceway surface side being situated in front as viewed in the rotational direction of the retainer. Note that each of the inclined grooves 40 may be straight as illustrated or alternatively curved. The provision of the inclined grooves 40 in the shoulder surfaces 4c of the outer ring 4 allows the grease moved from the outer diameter side annular groove 30 toward the outer ring 4 to be moved along the inclined grooves 40 and thereby directed onto the raceway surface 4a. Since each of the inclined groove 40 is not cut through to the end face of the outer ring 4, the grease moved from the outer diameter side annular groove 30 toward the outer ring 4 is prevented from flowing out of the groove 40 in the widthwise direction of the outer ring. Furthermore, the direction of inclination of the inclined groove 40 is defined such that the raceway surface side is situated in front while the outer ring end face side is situated behind when viewed in the rotational direction of the retainer, and therefore, rotation of the retainer will cause a force to move the grease from the outer ring end face side toward the raceway surface side.

Although the descriptions have been made of an embodiment of the invention in a double row angular ball bearing that is applied to a liquid fuel turbo pump bearing for rocket engines which are used in a low temperature and high-speed rotational environment, the invention is not limited thereto, but may also be widely applicable to rolling bearings that are employed for a variety of applications. Furthermore, while the angular ball bearing (whether multiple row or single row) has been illustrated as an example bearing type, the invention is also applicable even to other bearing types (for example, a deep groove ball bearing) in the case of which it is needless to say that the same effects can be expected.

REFERENCE SIGNS LIST

1 Angular ball bearing
2 Inner ring
2a Inner ring raceway surface
2b Groove
3 Inner ring spacer
3a Inner cylinder
3b Outer cylinder
3c Grease reservoir 3d Grease discharge groove
S Grease supply path
4 Outer ring
4a Outer ring raceway surface
4b Groove
4c Shoulder surface
5 Outer ring spacer
6 Rolling element (ball)
7 Resilient member (disc spring)
8 Retainer
9 Pillar
10 Pocket
12 Inner wall surface portions facing each other in the circumferential direction of the retainer
12a Arc section
12c Guide section
12d Rolling element retention
12b Straight section
14 Inner wall surface portions facing each other in the axial direction of the retainer
14a Arc section
14b Straight section
16 Arcuate recess
18 Arc-shaped space
20 Segment shaped space
22 Radial passage
24 Inner diameter side annular groove
26 Passageway
28 Inclined surface
30 Outer diameter side annular groove
32 Inclined surface
34 Step
36 Corner cut portion (symmetric)
38 Corner cut portion (asymmetric)
40 Inclined groove

The invention claimed is:

1. A rolling bearing unit, comprising:
an inner ring having a raceway surface on an outer circumference thereof;
an inner ring spacer being in contact with an end face of the inner ring and rotated in conjunction with the inner ring;
an outer ring having a raceway surface on an inner circumference thereof;
a plurality of rolling elements interposed between the raceway surface of the inner ring and the raceway surface of the outer ring; and
a retainer disposed between the inner ring and the outer ring and having a plurality of pockets for accommodating the rolling elements,
wherein, a centrifugal force is used to supply a grease from the inner ring spacer toward the retainer, and a radial passage penetrating from an inner diameter side to an outer diameter side of the retainer is provided between an inner wall surface of each of the pockets and each of the rolling elements so as to use each of the radial passages as a grease reservoir as well as a grease passage for allowing the grease adhering to the respective rolling element to move toward the raceway surface of the outer ring.

2. The rolling bearing unit according to claim 1, wherein each of the radial passages is made up of a segment shaped space between each of arcuate recesses formed at four corners of the respective pocket and the respective rolling element and an arc-shaped space formed between a first set of inner wall surface portions of the respective pocket and the respective rolling element, the first set of inner wall surface portions facing each other in an axial direction of the retainer.

3. The rolling bearing unit according to claim 2, wherein the first inner wall surface portions of each of the pockets are each made up of an arc section located at a center and straight sections located on both sides thereof, and the arc section is formed only of a part-cylindrical surface section.

4. The rolling bearing unit according to claim 3, wherein the part-cylindrical surface section of the first inner wall surface portions of each of the pockets is connected to an inner diameter side annular groove formed on an inner circumference of the retainer with an inclined surface disposed therebetween.

5. The rolling bearing unit according to claim 2, wherein an inner diameter side annular groove is formed on an inner circumference of the retainer, and the radial passages at least partially open to the inner diameter side annular groove.

6. The rolling bearing unit according to claim 2, wherein each of second inner wall surface portions of inner wall surfaces of each of the pockets facing each other in a circumferential direction of the retainer is made up of a center arc section and straight sections on both sides thereof, the center arc section being made up of a part-cylindrical guide section located on the outer diameter side of the retainer and greater in diameter than the respective rolling element and a rolling element retention located on the inner diameter side of the retainer and having a diameter decreasing down to a diameter smaller than the respective rolling element in a direction toward the inner diameter side of the retainer.

7. The rolling bearing unit according to claim 1, wherein an inner diameter side annular groove is formed on an inner circumference of the retainer, and the radial passages at least partially open to the inner diameter side annular groove.

8. The rolling bearing unit according to claim 7, wherein the inner diameter side annular groove is provided with a passageway so that of arcuate recesses at four corners of each of the pockets, arcuate recesses adjacent to each other in a circumferential direction of the retainer communicate with each other.

9. The rolling bearing unit according to claim 7, wherein each of second inner wall surface portions of inner wall surfaces of each of the pockets facing each other in a circumferential direction of the retainer is made up of a center arc section and straight sections on both sides thereof, the center arc section being made up of a part-cylindrical guide section located on the outer diameter side of the retainer and greater in diameter than the respective rolling element and a rolling element retention located on the inner diameter side of the retainer and having a diameter decreasing down to a diameter smaller than the respective rolling element in a direction toward the inner diameter side of the retainer.

10. The rolling bearing unit according to claim 1, wherein each of second inner wall surface portions of inner wall surfaces of each of the pockets facing each other in a circumferential direction of the retainer is made up of a center arc section and straight sections on both sides thereof, the center arc section being made up of a part-cylindrical guide section located on the outer diameter side of the retainer and greater in diameter than the respective rolling element and a rolling element retention located on the inner diameter side of the retainer and having a diameter decreasing down to a diameter smaller than the respective rolling element in a direction toward the inner diameter side of the retainer.

11. The rolling bearing unit according to claim 10, wherein the rolling element retention is part-spherical.

12. The rolling bearing unit according to claim 1, wherein an outer diameter side annular groove is formed in an outer circumferential surface of the retainer and widthwise extends beyond the radial passages.

13. The rolling bearing unit according to claim 12, wherein an inclined surface having a downslope toward the pocket and gradually reduced in width toward each of the pockets is provided in the outer diameter side annular groove, the inclined surfaces being situated in front of the pockets as viewed in a rotational direction of the retainer.

14. The rolling bearing unit according to claim 1, wherein the outer ring has shoulder surfaces on both sides of the raceway surface.

15. The rolling bearing unit according to claim 14, wherein corner cut portions are provided at intersections of the raceway surface and the shoulder surfaces of the outer ring.

16. The rolling bearing unit according to claim 15, wherein the corner cut portions are asymmetric, the corner cut portion located farther from an intersection of a line of action of a resultant of forces transmitted to the rolling elements and the raceway surface being greater than the corner cut portion located closer to the intersection.

17. The rolling bearing unit according to claim 14, wherein an inclined groove opening to the raceway surface is provided in at least one of the shoulder surfaces of the outer ring, the inclined groove being tilted relative to an axis of the outer ring, with an outer ring end face side of the inclined groove being in front while a raceway surface side of the inclined groove being behind when viewed in a rotational direction of the retainer.

18. The rolling bearing unit according to claim 17, wherein the inclined groove terminates close by an end face of the outer ring.

19. The rolling bearing unit according to claim 1, wherein the inner ring, the outer ring, and the rolling elements are made of a martensitic stainless steel, and the raceway surface of the inner ring, the raceway surface of the outer ring, and the surface of the rolling elements are coated with a PTFE film.

20. The rolling bearing unit according to claim 1, wherein the grease is applied in advance.

\* \* \* \* \*